(12) United States Patent
Mishra et al.

(10) Patent No.: US 12,468,643 B2
(45) Date of Patent: Nov. 11, 2025

(54) SYSTEM INTEGRATIONS BASED ON INTELLIGENT MONITORING

(71) Applicant: Oracle International Corporation, Redwood Shores, CA (US)

(72) Inventors: Debashis Upagupta Mishra, Jharsuguda (IN); Varun Jain, Foster City, CA (US); Suraj Singh, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 97 days.

(21) Appl. No.: 18/437,403

(22) Filed: Feb. 9, 2024

(65) Prior Publication Data

US 2025/0258788 A1    Aug. 14, 2025

(51) Int. Cl.
*G06F 13/22* (2006.01)

(52) U.S. Cl.
CPC ................... *G06F 13/22* (2013.01)

(58) Field of Classification Search
CPC ....................................................... G06F 13/22
See application file for complete search history.

(56) References Cited

U.S. PATENT DOCUMENTS

| | | | |
|---|---|---|---|
| 10,691,320 B2 | 6/2020 | Dhayanithi et al. | |
| 2019/0332508 A1* | 10/2019 | Goyal | G06F 11/3414 |
| 2020/0092832 A1* | 3/2020 | Nguyen-Dang | H04W 52/0209 |
| 2023/0135329 A1* | 5/2023 | Patodia | G06N 20/10 |
| | | | 705/64 |

FOREIGN PATENT DOCUMENTS

CN        117149392 A  * 12/2023  .......... G06F 9/4881

OTHER PUBLICATIONS

Translation of CN-117149392-A (Year: 2023).*
"Business Integration with SAP S/4HANA or SAPERP", Retrieved from https://help.sap.com/docs/sap-digital-manufacturing/integration-guide/business-integration-with-sap-s-4hana-or-sap-erp, Retrieved on Nov. 14, 2023, p. 1.
"Creating a notifier", Retrieved from https://airflow.apache.org/docs/apache-airflow/stable/howto/notifications.html, Retrieved on Nov. 14, 2023, p. 1.
"Data ingestion notifications", Retrieved from https://experienceleague.adobe.com/docs/experience-platform/ingestion/quality/subscribe-events.html?lang=en, Mar. 27, 2023, pp. 3.
"Data Ingestion", Retrieved from https://docs.hevodata.com/data-ingestion/, Oct. 10, 2023, pp. 4.

(Continued)

*Primary Examiner* — Henry Tsai
*Assistant Examiner* — John B Roche
(74) *Attorney, Agent, or Firm* — Invoke

(57) ABSTRACT

Techniques for facilitating efficient polling using machine learning are disclosed. A system uses historical data associated with execution of tasks to train a machine learning model to predict execution times. After receiving a request for execution of a task, the system provides a polling configuration to the requesting device that includes a polling frequency based on a prediction for when the task execution will be completed. This prediction is generated by the machine learning model.

20 Claims, 6 Drawing Sheets

(56) References Cited

OTHER PUBLICATIONS

"Data Ingestion", Retrieved from https://help.sap.com/docs/CONTEXT-DRIVEN_SERVICES/d9fc70f354604419842ad17e63e94827/a2524bcebc7a4909aec76a8abf587f11.html, Retrieved on Nov. 14, 2023, p. 1.

"How to build integration flows that send error notifications", Retrieved from https://docs.digibee.com/documentation/tutorials-and-best-practices/how-to-build-integration-flows-that-send-error-notifications, Retrieved on Nov. 14, 2023, pp. 3.

"Logging & Monitoring", Retrieved from https://airflow.apache.org/docs/apache-airflow/stable/administration-and-deployment/logging-monitoring/index.html, Retrieved on Nov. 14, 2023, p. 1.

"NetSuite ERP", Retrieved from https://docs.hevodata.com/sources/fna-analytics/netsuite-erp/, Nov. 14, 2023, p. 1.

"Purging Data in SAP ERP HCM", Retrieved from https://help.sap.com/docs/SAP_SUCCESSFACTORS_EMPLOYEE_CENTRAL_INTEGRATION_TO_SAP_BUSINESS_SUITE/c6f3a30d1bfe4c279be8ea2f2ecfb337/7107a13049b14b6a9102d514832bb3a3.html?version=2205, Retrieved on Nov. 14, 2023, p. 1.

"Resolving Event Failures", Retrieved from https://docs.hevodata.com/pipelines/failed-events-in-a-pipeline/resolving-event-failures/, Jun. 16, 2023, pp. 6.

"Runtime Dashboard", Retrieved from https://www.cisco.com/c/en/us/td/docs/cloud-systems-management/network-automation-and-management/dna-center-platform/2-2-3-0/user_guide/b_dnac_platform_ug_2_2_3/b_dnac_platform_ug_2_1_1_chapter_01000.pdf, Retrieved on Jul. 11, 2023, pp. 1-16.

Chezhiyan E., "Monitoring Azure Integration Services with Proactive Strategies", Retrieved from https://turbo360.com/blog/monitoring-azure-integration-services-with-proactive-strategies, May 2, 2023, pp. 10.

Dao et al., "Monitoring Data Ingestion Tasks with Amazon CloudWatch Metrics and Alarms", Retrieved from https://aws.amazon.com/blogs/mt/monitoring-data-ingestion-tasks-with-amazon-cloudwatch-metrics-and-alarms/, Sep. 28, 2022, pp. 11.

Stepanov, "Monitoring your integration flows", Retrieved from https://community.sap.com/t5/technology-blogs-by-sap/monitoring-your-integration-flows/ba-p/13181607, Apr. 29, 2016, pp. 15.

* cited by examiner

```
{
  "pollingInterval": 3000,
  "endpointUrl": "https://api.oracle.com/status",
  "timeout": 1000,
  "retryPolicy": {
    "maxRetries": 5,
    "retryInterval": 500,
    "strategy": "exponentialBackoff"
  },
  "dataFormat": "json",
  "authentication": {
    "token": "abcdef12345",
    "method": "Bearer"
  },
  "requestParameters": {
    "taskIdentifier": "123456",
  },
  "securityProtocol": "TLSv1.2",
  "errorHandling": {
    "404": "ignore",
    "500": "retry",
    "default": "log"
  },
  "version": "1.0",
  "startCondition": {
    "time": "08:00:00"
  },
  "endCondition": {
    "fileReceived": true
  }
}
```

FIG. 5C

SYSTEM INTEGRATIONS BASED ON INTELLIGENT MONITORING

TECHNICAL FIELD

The present disclosure relates to polling of computer systems. In particular, the present disclosure relates to generating dynamic polling intervals using machine learning.

BACKGROUND

Polling intervals in computing are pre-determined durations at which a computer system queries or checks the status of an external device, subsystem, or a set of specified conditions. This mechanism is integral to the functioning of various systems, including peripheral device management, network communications, software services monitoring, and computational task monitoring. Polling involves a system initiating requests or inquiries at these set intervals to ascertain the state, presence, or absence of change in another system, component, or data set. This process is applied in a wide range of scenarios, such as a server system querying sensors for real-time data or a software application routinely checking for the availability of updates or incoming communications. The strategic selection of appropriate polling intervals involves a trade-off between the timeliness of the information requested and resource expenditure.

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 5C illustrates an example polling configuration in accordance with one or more embodiments.

DETAILED DESCRIPTION

Figure 2:
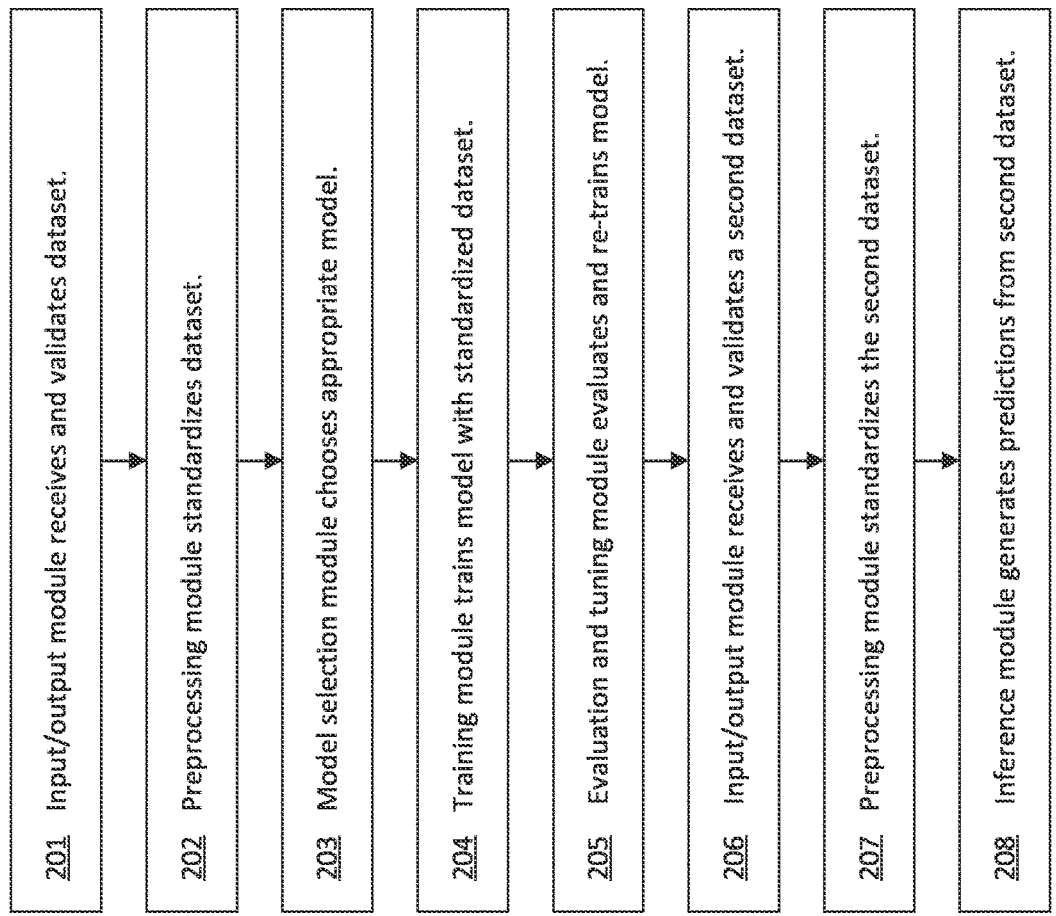
FIG. 2 illustrates the operation of a machine learning engine in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. MACHINE LEARNING ARCHITECTURE
3. DYNAMIC POLLING ARCHITECTURE
4. DYNAMIC POLLING OPERATION
5. EXAMPLE EMBODIMENTS
6. COMPUTER NETWORKS AND CLOUD NETWORKS
7. MICROSERVICE APPLICATIONS
8. HARDWARE OVERVIEW
9. MISCELLANEOUS; EXTENSIONS

1. GENERAL OVERVIEW

One or more embodiments use a machine learning model to configure polling operations in accordance with a predicted execution time of a task. The polling operations may, for example, be configured to poll for and obtain the results of a task that are generated upon the completion of the task.

Initially, the system trains a machine learning model to predict execution times for a task. The machine learning model may be trained using training datasets that include the characteristics of a task and a corresponding execution time. The characteristics of the task may be represented as a feature vector. The execution time may be submitted as a label for supervised machine learning. The system then applies the machine learning model to a target task to predict an execution time for the target task. The system generates a polling configuration based on the execution time predicted by the machine learning model. In an example, the system identifies a time at which the task is to be completed based on the predicted execution time. The system may then generate a polling configuration that identifies a time for an initial polling operation that substantially corresponds to a time at which the task is expected to be completed. The initial polling operation may be configured for a time that (a) exactly matches the expected completion time, (b) precedes the expected completion time, or (c) is subsequent to the expected completion time.

One or more embodiments generate a polling configuration including multiple specific times or various polling frequencies for executing a polling operation based on a task execution time predicted by a machine learning model. In an example, the system may select various polling frequencies for various corresponding time periods based on the task execution time predicted by the machine learning model. As described above, a system may use the predicted task execution time to predict an expected completion time for a task. The system may then define a polling frequency for polling the results of the task based on a difference between a current time and the expected completion time. If the current time is less than m1 minutes, hours, etc. before the expected completion time, then a first polling frequency f1 is selected. If the current time is less than m2 minutes, hours, etc. before the expected completion time, then a second polling frequency f2 is selected. As the current time gets closer to the expected completion time, the polling frequency is increased. Once the current time reaches or surpasses the expected completion time, the highest polling frequency may be maintained until the task is completed. Alternatively, the polling frequency may eventually be reduced as a difference between the current time and the expected completion time increases. In an example, there may be an error related to execution of the task that prevents completion of the task for generation of results that are to be collected by a polling operation. In order to avoid polling at a high frequency for a task that is unlikely to be completed due to an error or other issue, the system may decrease a polling frequency for a polling operation or altogether stop execution of the polling operation subsequent to the passage of a certain period of time since the expected completion time of the task.

One or more embodiments described in this Specification and/or recited in the claims may not be included in this General Overview section.

2. MACHINE LEARNING ARCHITECTURE

Figure 1:
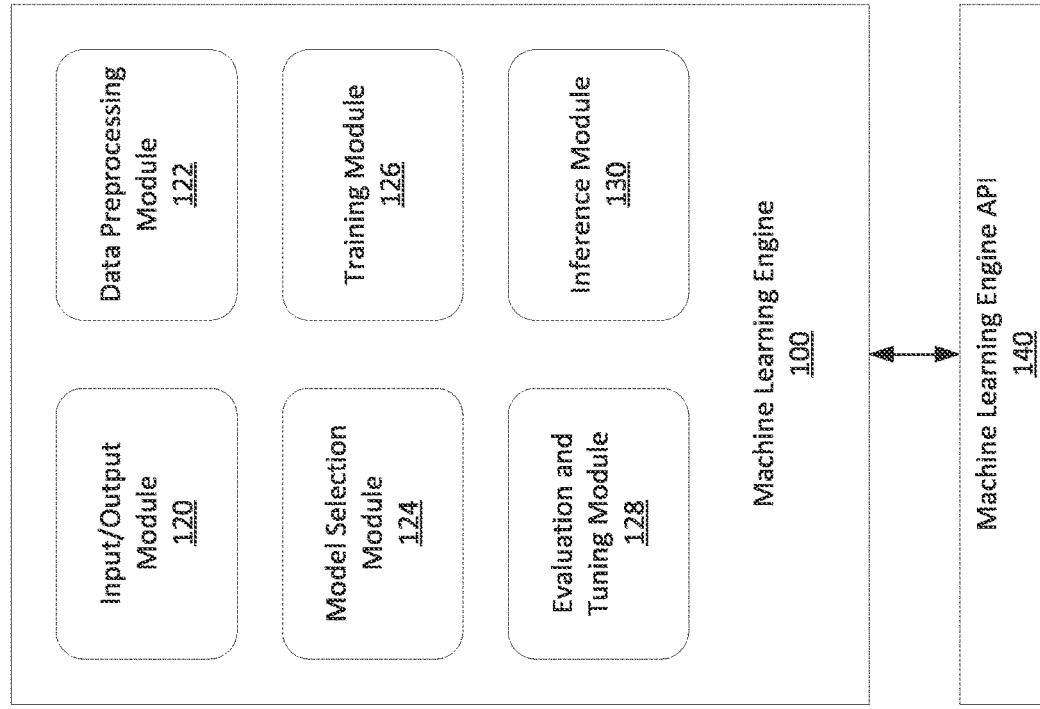
FIG. 1 shows a block diagram of a machine learning engine in accordance with one or more embodiments.

FIG. 1 illustrates a machine learning engine 100 in accordance with one or more embodiments. As illustrated in FIG. 1, machine learning engine 100 includes input/output module 120, data preprocessing module 122, model selection module 124, training module 126, evaluation and tuning module 128, and inference module 130.

In accordance with an embodiment, input/output module 120 serves as the primary interface for data entering and exiting the system, managing the flow and integrity of data. This module may accommodate a wide range of data sources and formats to facilitate integration and communication within the machine learning architecture.

In an embodiment, an input handler within input/output module 120 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 120 to be versatile in different operational contexts, whether processing historical datasets or streaming data.

In accordance with an embodiment, input/output module 120 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the machine learning process.

In an embodiment, an output handler within input/output module 120 includes an output framework designed to handle the distribution and exportation of outputs, predictions, or insights. Using the output framework, input/output module 120 formats these outputs into user-friendly and accessible formats, such as reports, visualizations, or data files compatible with other systems. Input/output module 120 also ensures secure and efficient transmission of these outputs to end-users or other systems in an embodiment and may employ encryption and secure data transfer protocols to maintain data confidentiality.

In accordance with an embodiment, data preprocessing module 122 transforms data into a format suitable for use by other modules in machine learning engine 100. For example, data preprocessing module 122 may transform raw data into a normalized or standardized format suitable for training machine learning models and for processing new data inputs for inference. In an embodiment, data preprocessing module 122 acts as a bridge between the raw data sources and the analytical capabilities of machine learning engine 100.

In an embodiment, data preprocessing module 122 begins by implementing a series of preprocessing steps to clean, normalize, and/or standardize the data. This involves handling a variety of anomalies, such as managing unexpected data elements, recognizing inconsistencies, or dealing with missing values. Some of these anomalies can be addressed through methods like imputation or removal of incomplete records, depending on the nature and volume of the missing data. Data preprocessing module 122 may be configured to handle anomalies in different ways depending on context. Data preprocessing module 122 also handles the normalization of numerical data in preparation for use with models sensitive to the scale of the data, like neural networks and distance-based algorithms. Normalization techniques, such as min-max scaling or z-score standardization, may be applied to bring numerical features to a common scale, enhancing the model's ability to learn effectively.

In an embodiment, data preprocessing module 122 includes a feature encoding framework that ensures categorical variables are transformed into a format that can be easily interpreted by machine learning algorithms. Techniques like one-hot encoding or label encoding may be employed to convert categorical data into numerical values, making them suitable for analysis. The module may also include feature selection mechanisms, where redundant or irrelevant features are identified and removed, thereby increasing the efficiency and performance of the model.

In accordance with an embodiment, when data preprocessing module 122 processes new data for inference, data preprocessing module 122 replicates the same preprocessing steps to ensure consistency with the training data format. This helps to avoid discrepancies between the training data format and the inference data format, thereby reducing the likelihood of inaccurate or invalid model predictions.

In an embodiment, model selection module 124 includes logic for determining the most suitable algorithm or model architecture for a given dataset and problem. This module operates in part by analyzing the characteristics of the input data, such as its dimensionality, distribution, and the type of problem (classification, regression, clustering, etc.).

In an embodiment, model selection module 124 employs a variety of statistical and analytical techniques to understand data patterns, identify potential correlations, and assess the complexity of the task. Based on this analysis, it then matches the data characteristics with the strengths and weaknesses of various available models. This can range from simple linear models for less complex problems to sophisticated deep learning architectures for tasks requiring feature extraction and high-level pattern recognition, such as image and speech recognition.

In an embodiment, model selection module 124 utilizes techniques from the field of Automated Machine Learning (AutoML). AutoML systems automate the process of model selection by rapidly prototyping and evaluating multiple models. They use techniques like Bayesian optimization, genetic algorithms, or reinforcement learning to explore the model space efficiently. Model selection module 124 may use these techniques to evaluate each candidate model based on performance metrics relevant to the task. For example, accuracy, precision, recall, or F1 score may be used for classification tasks and mean squared error metrics may be used for regression tasks. Accuracy measures the proportion of correct predictions (both positive and negative). Precision measures the proportion of actual positives among the predicted positive cases. Recall (also known as sensitivity) evaluates how well the model identifies actual positives. F1 Score is a single metric that accounts for both false positives and false negatives. The mean squared error (MSE) metric may be used for regression tasks. MSE measures the average squared difference between the actual and predicted values, providing an indication of the model's accuracy. A lower MSE may indicate a model's greater accuracy in predicting values, as it represents a smaller average discrepancy between the actual and predicted values.

In accordance with an embodiment, model selection module 124 also considers computational efficiency and resource constraints. This is meant to help ensure the selected model is both accurate and practical in terms of computational and time requirements. In an embodiment, certain features of model selection module 124 are configurable such as a configured bias toward (or against) computational efficiency.

In accordance with an embodiment, training module 126 manages the 'learning' process of machine learning models by implementing various learning algorithms that enable models to identify patterns and make predictions or decisions based on input data. In an embodiment, the training process begins with the preparation of the dataset after preprocessing; this involves splitting the data into training and validation sets. The training set is used to teach the model, while the validation set is used to evaluate its performance and adjust parameters accordingly. Training module 126 handles the iterative process of feeding the training data into the model, adjusting the model's internal parameters (like weights in neural networks) through backpropagation and optimization algorithms, such as stochastic gradient descent or other algorithms providing similarly useful results.

In accordance with an embodiment, training module 126 manages overfitting, where a model learns the training data too well, including its noise and outliers, at the expense of its ability to generalize to new data. Techniques such as regularization, dropout (in neural networks), and early stopping are implemented to mitigate this. Additionally, the module employs various techniques for hyperparameter tuning; this involves adjusting model parameters that are not directly learned from the training process, such as learning rate, the number of layers in a neural network, or the number of trees in a random forest.

In an embodiment, training module 126 includes logic to handle different types of data and learning tasks. For instance, it includes different training routines for supervised learning (where the training data comes with labels) and unsupervised learning (without labeled data). In the case of deep learning models, training module 126 also manages the complexities of training neural networks that include initializing network weights, choosing activation functions, and setting up neural network layers.

In an embodiment, evaluation and tuning module 128 incorporates dynamic feedback mechanisms and facilitates continuous model evolution to help ensure the system's relevance and accuracy as the data landscape changes. Evaluation and tuning module 128 conducts a detailed evaluation of a model's performance. This process involves using statistical methods and a variety of performance metrics to analyze the model's predictions against a validation dataset. The validation dataset, distinct from the training set, is instrumental in assessing the model's predictive accuracy and its capacity to generalize beyond the training data. The module's algorithms meticulously dissect the model's output, uncovering biases, variances, and the overall effectiveness of the model in capturing the underlying patterns of the data.

In an embodiment, evaluation and tuning module 128 performs continuous model tuning by using hyperparameter optimization. Evaluation and tuning module 128 performs an exploration of the hyperparameter space using algorithms, such as grid search, random search, or more sophisticated methods like Bayesian optimization. Evaluation and tuning module 128 uses these algorithms to iteratively adjust and refine the model's hyperparameters—settings that govern the model's learning process but are not directly learned from the data—to enhance the model's performance. This tuning process helps to balance the model's complexity with its ability to generalize and attempts to avoid the pitfalls of underfitting or overfitting.

In an embodiment, evaluation and tuning module 128 integrates data feedback and updates the model. Evaluation and tuning module 128 actively collects feedback from the model's real-world applications, an indicator of the model's performance in practical scenarios. Such feedback can come from various sources depending on the nature of the application. For example, in a user-centric application like a recommendation system, feedback might comprise user interactions, preferences, and responses. In other contexts, such as predicting events, it might involve analyzing the model's prediction errors, misclassifications, or other performance metrics in live environments.

In an embodiment, feedback integration logic within evaluation and tuning module 128 integrates this feedback using a process of assimilating new data patterns, user interactions, and error trends into the system's knowledge base. The feedback integration logic uses this information to identify shifts in data trends or emergent patterns that were not present or inadequately represented in the original training dataset. Based on this analysis, the module triggers a retraining or updating cycle for the model. If the feedback suggests minor deviations or incremental changes in data patterns, the feedback integration logic may employ incremental learning strategies, fine-tuning the model with the new data while retaining its previously learned knowledge. In cases where the feedback indicates significant shifts or the emergence of new patterns, a more comprehensive model updating process may be initiated. This process might involve revisiting the model selection process, re-evaluating the suitability of the current model architecture, and/or potentially exploring alternative models or configurations that are more attuned to the new data.

In accordance with an embodiment, throughout this iterative process of feedback integration and model updating, evaluation and tuning module 128 employs version control mechanisms to track changes, modifications, and the evolution of the model, facilitating transparency and allowing for rollback if necessary. This continuous learning and adaptation cycle, driven by real-world data and feedback, helps to endure the model's ongoing effectiveness, relevance, and accuracy.

In an embodiment, inference module 130 transforms data raw data into actionable, precise, and contextually relevant predictions. In addition to processing and applying a trained model to new data, inference module 130 may also include post-processing logic that refines the raw outputs of the model into meaningful insights.

In an embodiment, inference module 130 includes classification logic that takes the probabilistic outputs of the model and converts them into definitive class labels. This process involves an analytical interpretation of the probability distribution for each class. For example, in binary classification, the classification logic may identify the class with a probability above a certain threshold, but classification logic may also consider the relative probability distribution between classes to create a more nuanced and accurate classification.

In an embodiment, inference module 130 transforms the outputs of a trained model into definitive classifications. Inference module 130 employs the underlying model as a tool to generate probabilistic outputs for each potential class. It then engages in an interpretative process to convert these probabilities into concrete class labels.

In an embodiment, when inference module 130 receives the probabilistic outputs from the model, it analyzes these probabilities to determine how they are distributed across some or every potential class. If the highest probability is not significantly greater than the others, inference module 130 may determine that there is ambiguity or interpret this as a lack of confidence displayed by the model.

In an embodiment, inference module 130 uses thresholding techniques for applications where making a definitive decision based on the highest probability might not suffice due to the critical nature of the decision. In such cases, inference module 130 assesses if the highest probability surpasses a certain confidence threshold that is predetermined based on the specific requirements of the application. If the probabilities do not meet this threshold, inference module 130 may flag the result as uncertain or defer the decision to a human expert. Inference module 130 dynamically adjusts the decision thresholds based on the sensitivity and specificity requirements of the application, subject to calibration for balancing the trade-offs between false positives and false negatives.

In accordance with an embodiment, inference module 130 contextualizes the probability distribution against the backdrop of the specific application. This involves a comparative analysis, especially in instances where multiple classes have similar probability scores, to deduce the most plausible classification. In an embodiment, inference module 130 may incorporate additional decision-making rules or contextual information to guide this analysis, ensuring that the classification aligns with the practical and contextual nuances of the application.

In regression models, where the outputs are continuous values, inference module 130 may engage in a detailed scaling process in an embodiment. Outputs, often normalized or standardized during training for optimal model performance, are rescaled back to their original range. This rescaling involves recalibration of the output values using the original data's statistical parameters, such as mean and standard deviation, ensuring that the predictions are meaningful and comparable to the real-world scales they represent.

In an embodiment, inference module 130 incorporates domain-specific adjustments into its post-processing routine. This involves tailoring the model's output to align with specific industry knowledge or contextual information. For example, in financial forecasting, inference module 130 may adjust predictions based on current market trends, economic indicators, or recent significant events, ensuring that the outputs are both statistically accurate and practically relevant.

In an embodiment, inference module 130 includes logic to handle uncertainty and ambiguity in the model's predictions. In cases where inference module 130 outputs a measure of uncertainty, such as in Bayesian inference models, inference module 130 interprets these uncertainty measures by converting probabilistic distributions or confidence intervals into a format that can be easily understood and acted upon. This provides users with both a prediction and an insight into the confidence level of that prediction. In an embodiment, inference module 130 includes mechanisms for involving human oversight or integrating the instance into a feedback loop for subsequent analysis and model refinement.

In an embodiment, inference module 130 formats the final predictions for end-user consumption. Predictions are converted into visualizations, user-friendly reports, or interactive interfaces. In some systems, like recommendation engines, inference module 130 also integrates feedback mechanisms, where user responses to the predictions are used to continually refine and improve the model, creating a dynamic, self-improving system.

FIG. 2 illustrates the operation of a machine learning engine in one or more embodiments. At step 201, input/output module 120 receives a dataset intended for training. This data can originate from diverse sources, like databases or real-time data streams, and in varied formats, such as CSV, JSON, or XML. Input/output module 120 assesses and validates the data, ensuring its integrity by checking for consistency, data ranges, and types.

At step 202, training data is passed to data preprocessing module 122. Here, the data undergoes a series of transformations to standardize and clean it, making it suitable for training machine learning models. This involves normalizing numerical data, encoding categorical variables, and handling missing values through techniques like imputation.

At step 203, prepared data from the data preprocessing module 122 is then fed into model selection module 124. This module analyzes the characteristics of the processed data, such as dimensionality and distribution, and selects the most appropriate model architecture for the given dataset and problem. It employs statistical and analytical techniques to match the data with an optimal model, ranging from simpler models for less complex tasks to more advanced architectures for intricate tasks.

At step 204, training module 126 trains the selected model with the prepared dataset. It implements learning algorithms to adjust the model's internal parameters, optimizing them to identify patterns and relationships in the training data. Training module 126 also addresses the challenge of overfitting by implementing techniques, like regularization and early stopping, ensuring the model's generalizability.

At step 205, evaluation and tuning module 128 evaluates the trained model's performance using the validation dataset. Evaluation and tuning module 128 applies various metrics to assess predictive accuracy and generalization capabilities. It then tunes the model by adjusting hyperparameters, and if needed, incorporates feedback from the model's initial deployments, retraining the model with new data patterns identified from the feedback.

At step 206, input/output module 120 receives a dataset intended for inference. Input/output module 120 assesses and validates the data.

At step 207, data preprocessing module 122 receives the validated dataset intended for inference. Data preprocessing module 122 ensures that the data format used in training is replicated for the new inference data, maintaining consistency and accuracy for the model's predictions.

At step 208, inference module 130 processes the new data set intended for inference, using the trained and tuned model. It applies the model to this data, generating raw probabilistic outputs for predictions. Inference module 130 then executes a series of post-processing steps on these outputs, such as converting probabilities to class labels in classification tasks or rescaling values in regression tasks. It contextualizes the outputs as per the application's requirements, handling any uncertainty in predictions and formatting the final outputs for end-user consumption or integration into larger systems.

In an embodiment, machine learning engine API 140 allows for applications to leverage machine learning engine 100. In an embodiment, machine learning engine API 140 may be built on a RESTful architecture and offer stateless interactions over standard HTTP/HTTPS protocols. Machine learning engine API 140 may feature a variety of endpoints, each tailored to a specific function within machine learning engine 100. In an embodiment, endpoints such as/submitData facilitate the submission of new data for processing, while/retrieveResults is designed for fetching the outcomes of data analysis or model predictions. The MLE API may also include endpoints like/updateModel for model modifications and/trainModel to initiate training with new datasets.

In an embodiment, machine learning engine API 140 is equipped to support SOAP-based interactions. This extension involves defining a WSDL (Web Services Description Language) document that outlines the API's operations and the structure of request and response messages. In an embodiment, machine learning engine API 140 supports various data formats and communication styles. In an embodiment, machine learning engine API 140 endpoints may handle requests in JSON format or any other suitable format. For example, machine learning engine API 140 may process XML, and it may also be engineered to handle more compact and efficient data formats, such as Protocol Buffers or Avro, for use in bandwidth-limited scenarios.

In an embodiment, machine learning engine API 140 is designed to integrate WebSocket technology for applications necessitating real-time data processing and immediate feedback. This integration enables a continuous, bi-directional communication channel for a dynamic and interactive data exchange between the application and machine learning engine 100.

2. DYNAMIC POLLING ARCHITECTURE

Figure 3:
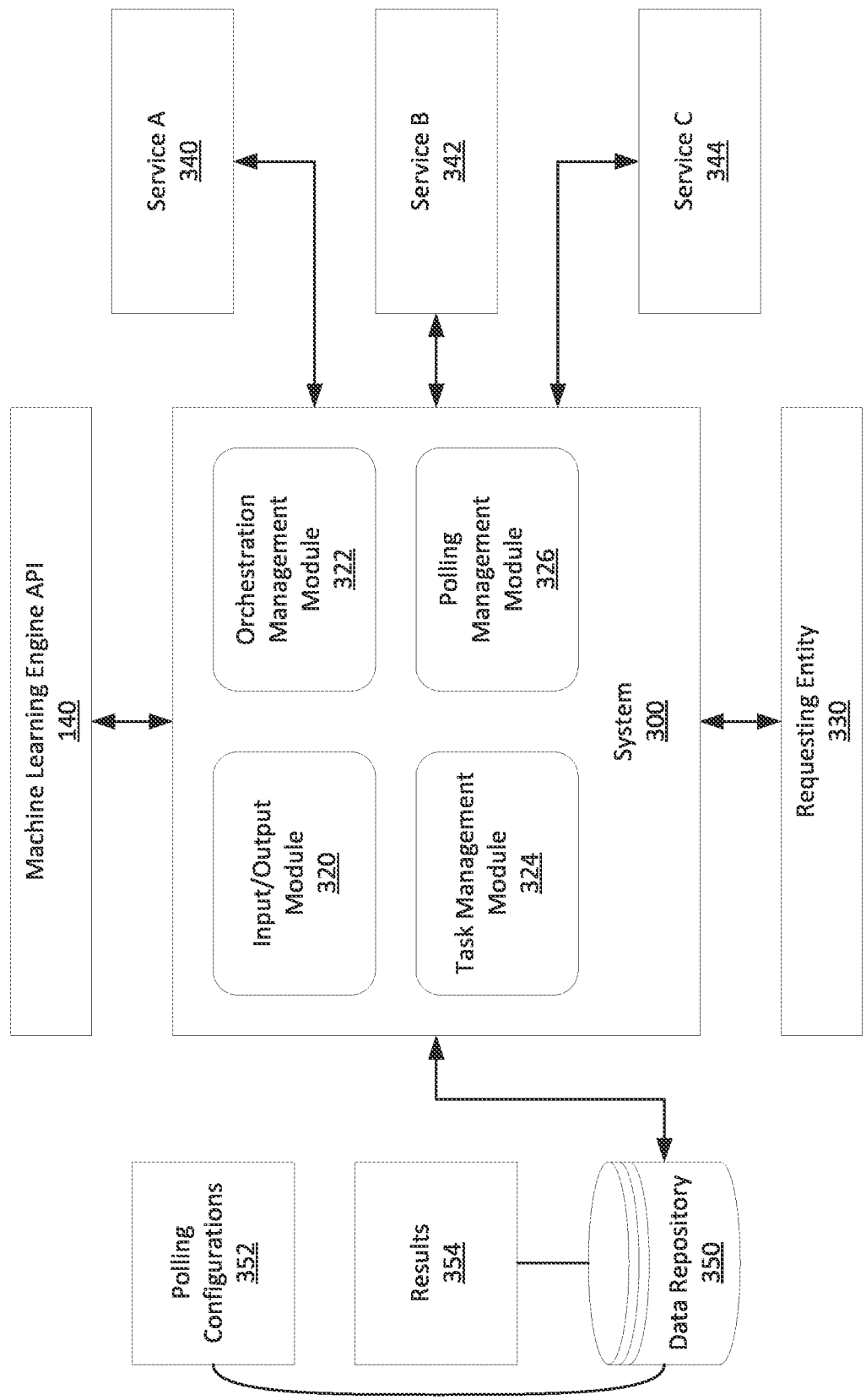
FIG. 3 shows a block diagram of a system in accordance with one or more embodiments.

FIG. 3 shows a block diagram of a system in accordance with one or more embodiments. As illustrated in FIG. 3, system 300 includes input/output module 320, orchestration management module 322, task management module 324, and polling management module 326. In one or more embodiments, system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in Section 5, titled "Computer Networks and Cloud Networks."

In one or more embodiments, a data repository 350 is any type of storage unit and/or device (e.g., a file system, database, collection of tables, or any other storage mechanism) for storing data such as polling configurations 352 and data related to task execution times for training a machine learning model. For example, polling configurations which have been provided to requesting entities may be stored in a polling configuration 352 table in data repository 350. Other information related to polling configurations, including templates, may be stored in polling configuration 352. In addition, data repository 350 includes results 340 related to polling operations and/or tasks. For example, an orchestration summary may be generated based on information collected from services executing tasks (e.g., service A 340, service B 342, and service C 344). Once the orchestration summary is generated, it may be stored in data repository 350 in a results 354 table. Further, a data repository 350 may include multiple different storage units and/or devices. The multiple different storage units and/or devices may or may not be of the same type or located at the same physical site. Further, data repository 350 may be implemented or executed on the same computing system as system 300 or requesting entity 330. Additionally, or alternatively, data repository 350 may be implemented or executed on a computing system separate from system 300. Data repository 350 may be communicatively coupled to system 300 via a direct connection or via a network.

In accordance with an embodiment, system 300 communicates with one or more services (for example, service A 340, service B 342, and service C 344). The term "service" can be defined as any logically designed sequence of operations, processes, or activities that are intended to be executed, performed, or carried out in response to a request or instruction received from a computing device. This definition encompasses a wide array of functionalities and mechanisms, ranging from simple to complex, that are implemented in software, firmware, hardware, or any combination thereof. A service is an encapsulated unit of functionality that is distinct and modular, designed to achieve a specific outcome or set of outcomes based on a predefined set of inputs or triggers.

In an embodiment, service A 340, service B 342, and service C 344 are agnostic of the consumer, meaning they can cater to various computing devices or clients, including physical hardware like computers, smartphones, and IoT devices, or other software components, such as applications, microservices, or systems. Service A 340, service B 342, and service C 344 operate on the principle of receiving, processing, and responding to requests that can vary in complexity from simple data retrieval to complex computational tasks. These requests are conveyed through well-defined interfaces or communication protocols, enabling a seamless interaction between the service and the entity requesting the service.

In an embodiment, service A 340, service B 342, and service C 344 may each operate in a standalone manner or as part of a larger ecosystem of services or microservices, often communicating and interacting with other services to complete more elaborate and integrated operations. For example, the completion of activity by service A 340 may be required before activity execution of service B 342 can begin, while service C 344 may perform concurrently with service A 340. This modularity and interoperability allow for flexible, scalable, and efficient designs that can be adapted to various contexts and requirements. The concept of a service as defined herein is intentionally broad and inclusive, designed to encompass a wide range of computational operations and interactions, thereby providing comprehensive coverage in the realm of digital and computing technologies.

In an embodiment, service A 340, service B 342, and service C 344 generate data as they perform their associated tasks. Requesting entity 330 may poll system 300 with periodic requests to retrieve this data. The intervals at which polling takes place may be dependent on various factors such as expected completion times associated with each service.

In accordance with an embodiment, input/output module 320 serves as the primary interface for data entering and exiting system 300, managing the flow and integrity of data. This module may accommodate a wide range of data sources and formats to facilitate integration and communication with requesting entity 330, machine learning engine API 140, data repository 350, and services, such as service A 340, service B 342, and service C 344. For example, input/output module 320 manages polling requests from requesting entity 330. Input/output module 320 also manages communication with machine learning engine API 140 and data repository 350 to provide stored polling information and collect predicted polling times.

In an embodiment, an input handler within input/output module 320 includes a data ingestion framework capable of interfacing with various data sources, such as databases, APIs, file systems, and real-time data streams. This framework is equipped with functionalities to handle different data formats (e.g., CSV, JSON, XML) and efficiently manage large volumes of data. It includes mechanisms for batch and real-time data processing that enable the input/output module 320 to be versatile in different operational contexts, whether processing historical datasets or streaming data.

In accordance with an embodiment, input/output module 320 manages data integrity and quality as it enters the system by incorporating initial checks and validations. These checks and validations ensure that incoming data meets predefined quality standards, like checking for missing values, ensuring consistency in data formats, and verifying data ranges and types. This proactive approach to data quality minimizes potential errors and inconsistencies in later stages of the machine learning process.

In an embodiment, an output handler within input/output module 320 includes an output framework designed to manage the distribution and exportation of outputs. Using the output framework, input/output module 320 formats these outputs into user-friendly and accessible formats, such as reports, visualizations, or data files compatible with other systems. Input/output module 320 also ensures secure and efficient transmission of these outputs to end-users or other systems in an embodiment and may employ encryption and secure data transfer protocols to maintain data confidentiality.

In one or more embodiments, a task management module 324 is configured to interpret requests from another entity such as requesting entity 330. Such requests may be provided to task management module 322 by input/output module 320 in an embodiment. Upon receipt of such a request, task management module 324 initiates a sequence of operations designed to facilitate the completion of the specified task.

In an embodiment, task management module 324 identifies and activates a series of one or more services, each responsible for executing a specific sub-task within the overall task. Task management module 324 is equipped with logic to determine the required services and the sequence that these services should be executed. This sequencing may be linear, where each service is activated in a predetermined order, or conditional, where the order of service activation depends on the outcomes of preceding services or other external factors.

In an embodiment, the task management module monitors and evaluates the success of each sub-task performed by the activated services. This monitoring function helps to ensure the overall integrity and success of the task, and informs polling management module of changes in task requirements that may impact completion times and trigger polling configuration changes. These changes may include any evolution of task requirements such as updated workflows, updated software versions associated with services and microservices, and new data requirements for each task. In the event of a sub-task failure, task management module 324 may employ a rollback mechanism that allows task management module 324 to revert the task to a previous state, negating the effects of the failed sub-task. The rollback process may involve the deactivation of services, the reversal of changes made during the task execution, or the re-initiation of certain sub-tasks.

In an embodiment, task management module 324 includes configurable tracking logic. Tracking logic allows for the customization of how task status is monitored and recorded. The tracking configuration can be predefined in the settings for task management module 324, or it may be specified dynamically by the requesting entity. This flexibility enables task management module 324 to adapt to a variety of operational requirements and scenarios, allowing for either comprehensive monitoring, where every aspect of the task execution is tracked, or selective monitoring, where key milestones or outcomes are recorded.

In one or more embodiments, orchestration management module 322 gathers detailed information about the execution of tasks and their sub-components, providing an advanced level of monitoring and sub-task analysis. Orchestration management module 322 may gather information via direct communication with individual services responsible for executing sub-tasks. Establishing real-time communication channels allows orchestration management module 322 to receive immediate updates and detailed reports about the status, progress, and outcomes of these sub-tasks.

In one or more embodiments, orchestration management module 322 gathers information by analyzing log files generated by services performing sub-tasks. By parsing these log files, the module extracts essential data points, including timestamps, error codes, performance metrics, and operational anomalies. Log analysis provides an understanding of the historical performance of each sub-task.

In an embodiment, orchestration management module 322 is equipped with other mechanisms to gather relevant data. These include interfacing with database systems to retrieve transaction logs, querying system monitors for resource utilization statistics, or tapping into network analytics for data transmission insights. Each of these mechanisms contributes a unique perspective to the overall task and sub-task analysis, ensuring a comprehensive understanding of task and sub-task execution. In an embodiment, orchestration management module 322 provides more granular data to polling management module for use in predictions and polling configuration.

In one or more embodiments, orchestration management module 322 is equipped with logic for generating, consolidating, and normalizing data into structured reports known as orchestration summaries. An orchestration summary provides a detailed, comprehensive account of a task's execution journey, including the status of each sub-task as well as in-depth insights into how each was performed or why it was not performed. An orchestration summary highlights successes, pinpoints failures, and identifies areas for improvement. For example, an execution summary provided by the orchestration management module 322 may include detailed information about the execution of a data import task involving a normalization service, a data validation service, and a logging service. The orchestration summary documents each phase of the task, starting from the normalization service that processes and formats the incoming data into a standardized structure. It then details the activities of the data validation service that check the data for accuracy and consistency, flagging any discrepancies or errors encountered. Following this, the logging service's execution is documented, describing how it captures and stores detailed logs of the entire operation, including timestamps, system interactions, and any anomalies detected during the process. This comprehensive summary sheds light on the success or failure of each individual service and provides a cohesive view of the data import task's overall execution, illustrating the interplay and dependencies between the numerous services involved.

In one or more embodiments, orchestration management module 322 may format an orchestration summary for consumption by requesting entity 330. The orchestration summary offers crucial insights into the system's operational efficacy, enabling informed decision-making for requesting entity 330. The delivery of this summary can be customized to meet the specific needs of requesting entity 330, whether it requires real-time updates, periodic reports, or on-demand summaries, ensuring that the information provided is both comprehensive and relevant.

In one or more embodiments, polling management module 326 includes logic for managing and optimizing data communication processes. Polling management module 326 implements adaptive polling strategies, intelligently adjusting the frequency of polling in response to varying network conditions, server loads, and the priority of data. This dynamic adjustment ensures efficient system resource utilization while maintaining timely data delivery. In an embodiment, the polling management module is responsible for load balancing as well as distributing polling requests across multiple systems or network paths to prevent bottlenecks, thus optimizing system performance and ensuring consistent reliability.

In one or more embodiments, polling management module 326 includes logic for data caching and synchronization. For example, polling management module 326 may include logic for storing recently polled data to reduce the need for more frequent polling. This cached data may be synchronized on a regular schedule to provide the most current information even with reduced polling frequencies.

In one or more embodiments, polling management module 326 incorporates error handling and retry logic. In case of polling failures, such as communication timeouts or errors, the module initiates, retries, or escalates the issue as programmed, ensuring reliability in data communication.

In one or more embodiments, polling management module 326 includes a notification system. This system is triggered when significant data changes are detected, alerting the relevant entities within the system to respond promptly to critical updates or issues. In an embodiment, polling management module 326 also includes comprehensive polling analytics that collect and analyze data about the polling process itself to continuously refine and optimize the polling strategies. For example, polling management module 326 may monitor response times and success rates.

In one or more embodiments, polling management module 326 includes security logic that implement security checks and authorize validations for each polling request and response, maintaining the integrity and confidentiality of data exchanges within the system. In addition to these security measures, polling management module 326 actively manages the bandwidth utilized by polling activities in an embodiment, prioritizing essential data and using data compression techniques to reduce bandwidth usage.

In one or more embodiments, polling management module 326 integrates with other modules in system 300, such as the orchestration management module or task management module. This integration ensures that the polling activities are aligned with the overall system operations and workflows. For example, polling management module 326 integrates with orchestration management module 322 and task management module 324 to gather information about the status of tasks and sub-tasks. Polling management module 326 may then normalize this data if necessary and send it to machine learning engine 100 via machine learning engine API 140 to obtain predictions about completion times for tasks, sub-tasks, or other activities like orchestration summary generation.

In one or more embodiments, polling management module 326 generates a polling configuration based at least in part on output from machine learning engine 100. For example, machine learning engine 100 may provide a prediction that includes an estimated completion time for each sub-task in a task that polling management module 326 may use to estimate task completion time. This may be an indicator, for example, of the availability of an orchestration summary. In another embodiment, machine learning engine 100 may provide a prediction about the availability of an orchestration summary. In another embodiment, the polling configuration may be generated based on other information, such as internal logic and algorithmic predictions residing in polling management module 326.

In one or more embodiments, polling management module 326 includes logic for providing one or more polling configurations to requesting entity 330. The polling configuration may include a suggested request window for making a request for information along with a suggested polling frequency. For example, requesting entity 330 may request performance of a task that includes activity from service A 340, service B 342, and service C 344. Requesting entity 330 may expect an orchestration summary to become available upon completion of the task, so requesting entity 330 will request the orchestration summary periodically in accordance with a polling configuration provided by polling management module 326.

In one or more embodiments, system 300 refers to hardware and/or software configured to perform operations described herein for facilitating dynamic polling operations. Examples of operations for dynamic polling are described below with reference to FIG. 4.

In an embodiment, system 300 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

3. DYNAMIC POLLING OPERATION

Figure 4:
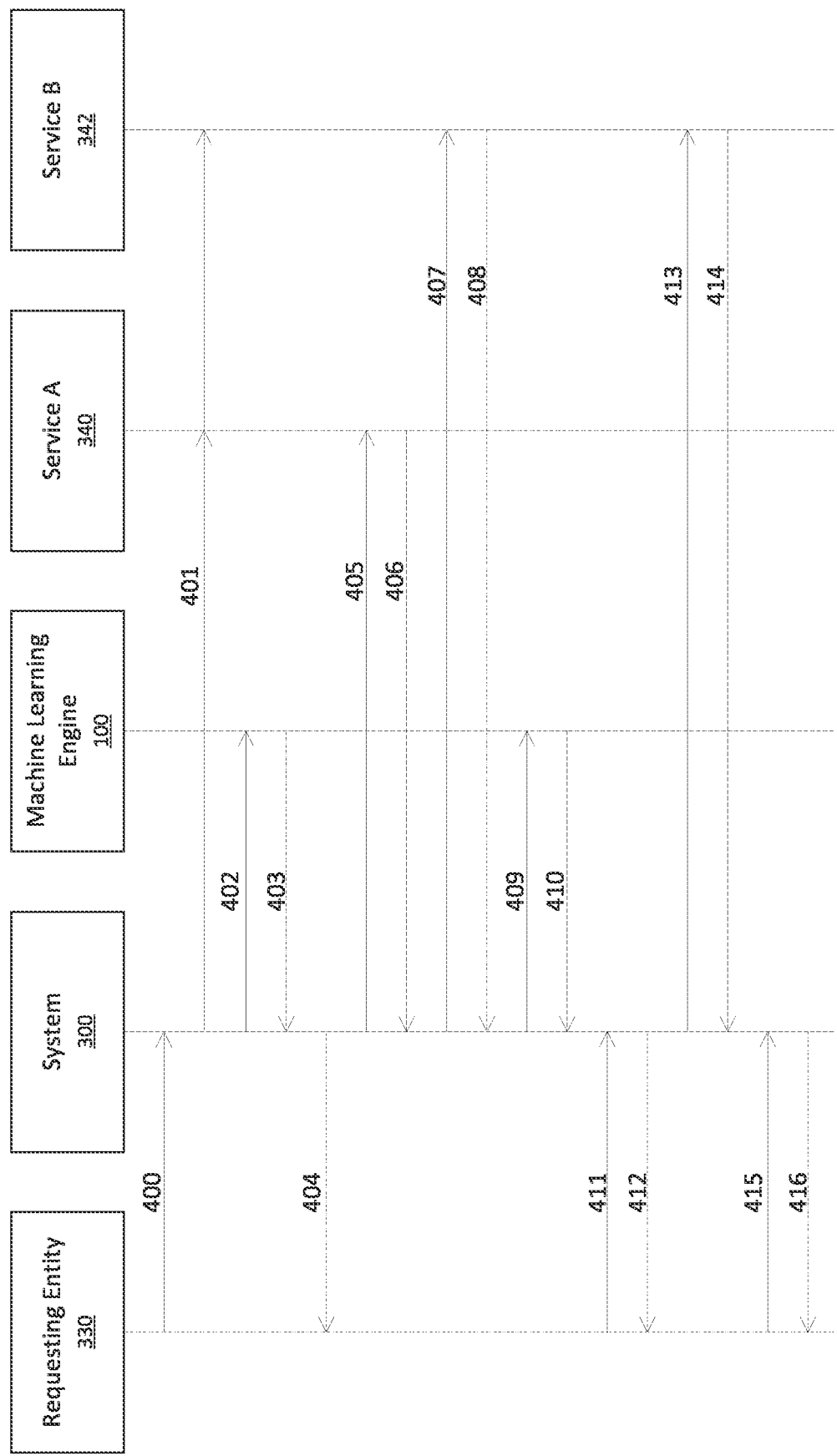
FIG. 4 illustrates an example set of operations for dynamically generating and managing polling activity in accordance with one or more embodiments.

FIG. 4 illustrates an example set of operations for dynamically generating and managing polling activity in accordance with one or more embodiments. One or more operations illustrated in FIG. 4 may be modified, rearranged, performed in parallel, or omitted. Accordingly, the sequence of operations illustrated in FIG. 4 should not be construed as limiting the scope of one or more embodiments.

At step 400, system 300 receives a task request to perform a task from requesting entity 330. For example, the task may be to perform every operation that is required to import a large data set into a database. At step 401, system 300 triggers the services necessary to perform the task request, service A 340 and service B 342. At step 402, system 300 sends a prediction request to machine learning engine 100 for a prediction indicating the expected amount of time needed to process the task request from requesting entity 330. The prediction request may include information about the services that need to be executed for sub-tasks, number of records to be imported, status of the systems and network, bandwidth and processing restrictions, service levels, priority, and any other relevant information that may be used by machine learning engine 300 to make the requested prediction.

At step 403, machine learning engine 100, trained using historical data for similar tasks involving a similar set of services and conditions in accordance with Section 2, titled "Machine Learning Architecture", generates a prediction in accordance with an appropriate machine learning model and sends the prediction to system 300. The characteristics of the task may be represented as a feature vector. For example, in the context of monitoring and analyzing the performance of a microservice, a feature vector could be created to capture various aspects of tasks performed by the service. This feature vector would help in understanding, predicting, and optimizing the task completion times. A feature vector might include:

Task Type: An identifier for the type of task being performed. This could be encoded as an integer or a one-hot encoded vector if there are multiple task types.

Task Size: A numerical value representing the size or complexity of the task. This could be measured in units relevant to the task, such as the number of items to process, the size of data to handle, etc.

CPU Usage: The amount of CPU resources consumed by the task, possibly measured as a percentage of total CPU capacity or in units of CPU time.

Memory Usage: The amount of memory utilized during the task, which could be measured in megabytes or as a percentage of total available memory.

I/O Operations: The number of input/output operations involved in the task. This can be critical in understanding performance, especially for data-intensive tasks.

Network Latency: The network delay experienced during the task execution, measured in milliseconds. This is particularly important for distributed microservices.

Concurrent Tasks: The number of other tasks running concurrently with the given task. This helps in understanding the load on the service.

Prior Task Completion Time: The completion time of the previous task or tasks, which can sometimes influence the current task's performance.

Error Rate: The rate of errors or exceptions encountered during task execution.

Time of Day: The time at which the task was executed. This can be relevant if the microservice's performance varies depending on the time of day due to varying loads.

Each of these features captures a different aspect of the task and its execution environment. When combined into a vector, they provide a comprehensive profile of each task. This feature vector can then be used to predict task completion times, identify bottlenecks, or optimize resource allocation.

The feature vector may be submitted with labels for supervised machine learning. Each training instance consists of a feature vector and a corresponding label. In the context of feature vector described above, the features describe various aspects of the task performed by a microservice, and the label could be the task completion time or a categorical variable indicating the success or failure of the task. The features identified above form the input feature vector. Each element in this vector provides specific information about the task and its execution context. The task completion time would be the label, representing the target variable that the system is trying to predict or classify. In a regression setting, the task completion time would be a continuous variable. In a classification setting, the task outcome might be categorical (e.g., 'Success' or 'Failure'). In the context of polling configurations, the completion time is the most useful label.

The system then applies the machine learning model to a target task to predict an execution time for the target task. In an embodiment, the model learns to associate patterns in the feature vectors with the corresponding task completion times or outcomes. After training, the model is used to predict the completion time or outcome of new tasks based on their feature vectors. Predictions may include a prediction for each sub-task, a prediction for the task, or both. The prediction may include a set of predictions with metadata that includes rules for system 300 to consider during a re-evaluation of the prediction that may be performed by prediction management module 326.

At step 404, system 300 provides to requesting entity 330 a polling configuration based at least in part on the prediction along with a task identifier. The polling configuration includes information indicating a suggested polling interval which represents the among time that requesting entity 330 should wait between requests for an orchestration summary or other information from system 300. Entity 330 will continue to request an orchestration summary or other information at the polling interval after determining that the orchestration summary is unavailable. In an example, the system identifies a time at which the task is to be completed based on the predicted execution time. The system may then generate a polling configuration that identifies a time for an initial polling operation that substantially corresponds to a time at which the task is expected to be completed. The initial polling operation may be configured for a time that (a) exactly matches the expected completion time, (b) precedes the expected completion time, or (c) is subsequent to the expected completion time.

In an embodiment, the polling configuration may include multiple specific times or various polling frequencies for executing a polling operation based on a task execution time predicted by a machine learning model. In an example, the system may select various polling frequencies for various corresponding time periods based on the task execution time predicted by the machine learning model. The system may use the predicted task execution time to predict an expected completion time for a task. The system may then define a polling frequency for polling the results of the task based on a difference between a current time and the expected completion time. If the current time is less than m1 minutes, hours, etc. before the expected completion time, then a first polling frequency f1 is selected. If the current time is less than m2 minutes, hours, etc. before the expected completion time, then a second polling frequency f2 is selected.

At step 405, system 300 requests status information from service A 340 about its performance of a sub-task assigned to it. In a typical microservices architecture, for example, when a system needs to request status information from a service, it initiates an HTTP GET request to a predefined status endpoint of the target service, such as/health or/status. This endpoint is part of the service's API and is designed to respond with status data. Other services may use different mechanisms or protocols to make such a request. Other services may use different mechanisms or protocols to make such a request. For example, some systems might employ messaging protocols like AMQP or MQTT for status inquiries, particularly in event-driven architectures where services communicate through message brokers. In such cases, a service would publish a status request message to a specific topic or queue, and the target service, subscribed to that topic, would respond with its status in a similar manner. Alternatively, gRPC could be used, especially in microservices architectures that favor high-performance, bi-directional streaming and require efficient, low-latency communication. With gRPC, the client service would make a remote procedure call to the server service, which then sends back the status data in a compact, binary format. In some systems, Simple Object Access Protocol (SOAP) might be employed, involving XML-based messages over HTTP. Additionally, for internal status checks within a service or application, inter-process communication (IPC) mechanisms like named pipes or shared memory might be used, bypassing network protocols for faster, local data exchange.

At step 406, service A 340 provides status information to system 300 indicating that service A 340 has either completed the sub-task or has otherwise reached a final state (e.g., execution has been terminated or an error has occurred). In an embodiment, service 340A executes internal checks to gather the relevant status information requested. These checks can include, but are not limited to, database connectivity tests, checks on critical internal variables, and queries to dependent services or systems. The service then compiles this data into a structured format such as JSON, detailing various aspects of its health and performance. This response might include metrics such as CPU and memory usage, response times, error rates, and any service-specific information that is pertinent to its operational status. The service sends this data back in the HTTP response to the requesting system.

At step 407, system 300 requests status information from service B 342 about its performance of a sub-task assigned to it. Service B 342 performs a similar status check as described in step 406 but may use different protocols or communication mechanisms to interact with system 300. At step 408, service B 342 provides status information to system 300 indicating that service B 342 has not reached a final state (e.g., has not completed the sub-task and has not stopped execution).

At step 409, system 300 sends a revised prediction request to machine learning engine 100 for an updated prediction, indicating the expected amount of time needed to process the task request from requesting entity 330. As the current time gets closer to the expected completion time, the polling frequency increases. Once the current time reaches or surpasses the expected completion time, the highest polling frequency may be maintained until the task is completed. Alternatively, the polling frequency may eventually be reduced as a difference between the current time and the expected completion time increases. In an example, there may be an error related to execution of the task that prevents completion of the task for generation of results that are to be collected by a polling operation. To avoid polling at a high frequency for a task that is unlikely to be completed due to an error or other issue, the system may decrease a polling frequency for a polling operation or altogether stop execution of the polling operation subsequent to the passage of a certain period of time since the expected completion time of the task. The revised prediction request includes an indicator that informs machine learning engine 100 that service A 340 has completed its associated sub-task. At step 410, machine learning engine 100 provides a revised prediction for completion of the assigned task, including associated sub-tasks.

At step 411, requesting entity 330 makes a request to system 300 for the orchestration summary based on the initial polling configuration that was provided to requesting entity 330 at step 404, providing the task identifier as part of the request. The polling configuration includes settings that determine how frequently requesting entity 330 makes a request to system 300 for the orchestration summary. Requesting entity 330 stores the task identifier associated with the polling configuration so requests can be made by referencing the task identifier.

Requesting entity 330 will initiate a polling action at the start of each interval until the polling action results in the desired outcome. In this case, the desired outcome is that requesting entity 330 receives the orchestration summary. In other embodiments, polling may involve sending a request to a server, checking the status of a device, or querying a database.

After each request is made, requesting entity 330 will receive a response from system 300. Requesting entity 330 will handle this response, which may involve updating the user interface with new data (e.g., if it receives an orchestration summary), triggering certain processes if a change in status is detected, or simply waiting for the next poll if no new data is available. Requesting entity 330 may incorporate adaptive polling technology separate and apart from instructions received from system 300 to change the polling configuration based on machine learning predictions. For example, requesting entity 330 could change the frequency of polling based on certain criteria, like the time of day, the volume of data typically received, or the criticality of the information.

In an embodiment, the polling configuration might also include settings for error handling and retries. If a polling attempt fails (due to network issues, server downtime, etc.), the client might retry after a certain period or escalate the issue. The error handling and retry configuration may be based on machine learning predictions if metadata associated with error handling and retry information was included in the feature vector provided to the machine learning model.

In response to this request, at step 412, system 300 matches the task identifier with the associated orchestration details and determines that the orchestration summary is not yet complete. This determination can be made by querying orchestration management module 322's status endpoint, which might return a status code or message indicating that tasks are still in progress. Alternatively, this information could be inferred through the absence of a completion signal or message that system 300 expects to receive once the orchestration details are ready. In some architectures, the system might check a shared database or a state management service where the progress of tasks is tracked, and the lack of an update to the task's status would indicate incompletion. In some embodiments the system might subscribe to event streams or use webhooks to get immediate notifications about the task status, thus avoiding the need for periodic polling. In response to determining that the orchestration summary is not yet complete, system 300 provides an updated polling configuration to requesting entity 330. The updated polling configuration is based at least in part on the revised prediction provided by machine learning engine 100 at step 410.

At step 413, system 300 requests status information from service B 342 about its performance of a sub-task assigned to it. This may be performed by orchestration management module 322. This request can be made by querying an endpoint for service B 342, which might return a status code or message indicating that tasks are still in progress.

At step 414, service B 342 provides status information to system 300 indicating that service B 342 has reached a final state. This means that the service has completed all tasks assigned to it, or that the service has no further execution to perform (e.g., due to an error or other terminating circumstances). In response to determining that the sub-tasks assigned to both service a 340 and service b 342 have been completed, thereby completing the task associated with the task identifier provided in the polling configuration at step 404, system 300 finishes creating the orchestration summary.

In an embodiment, services such as service B 342 can provide a variety of information in response to status requests. For example, services may provide a health status indicating whether the microservice is operational or not. A simple binary "healthy/unhealthy" or "up/down" may be used. Performance metrics may also be provided, including data like response times, throughput (requests per second), and processing times. This information helps in assessing whether the service is performing as expected. Resource utilization metrics can also be provided to show CPU usage, memory usage, disk I/O information, and network I/O information to help determine if the service is under a resource strain. The service may provide the number or rate of errors encountered. This can include HTTP error codes for web services, exceptions thrown, or custom error metrics relevant to the service's functionality. Depending on what the service does, it might provide more service-specific data. For example, a database service might report on query times and the number of active connections, while a payment processing service might report on transaction volumes. A dependency status report may also be provided by the service. Microservices in particular often depend on other services or databases. Reporting on the status of these dependencies (whether they are accessible and healthy) is helpful for debugging issues, and for predicting completion times. The service may also provide details about the current version of the service, such as the build number, which can be useful for tracking, troubleshooting, and prediction purposes. Services that process tasks or messages in a queue may report the length of the queue or the processing time of each task. This is helpful for predicting completion times.

At step 415, requesting system 330 makes a request to system 300 for the orchestration summary based on the revised polling configuration that was provided to requesting entity 330 at step 412, providing the task identifier as part of the request. In response to this request, at step 416, system 300 matches the task identifier with the orchestration summary and provides the orchestration summary to requesting entity 330.

4. EXAMPLE EMBODIMENTS

A detailed example is described below for purposes of clarity. Components and/or operations described below should be understood as one specific example that may not be applicable to certain embodiments. Accordingly, components and/or operations described below should not be construed as limiting the scope of any of the claims.

Figures 5A, 5B:
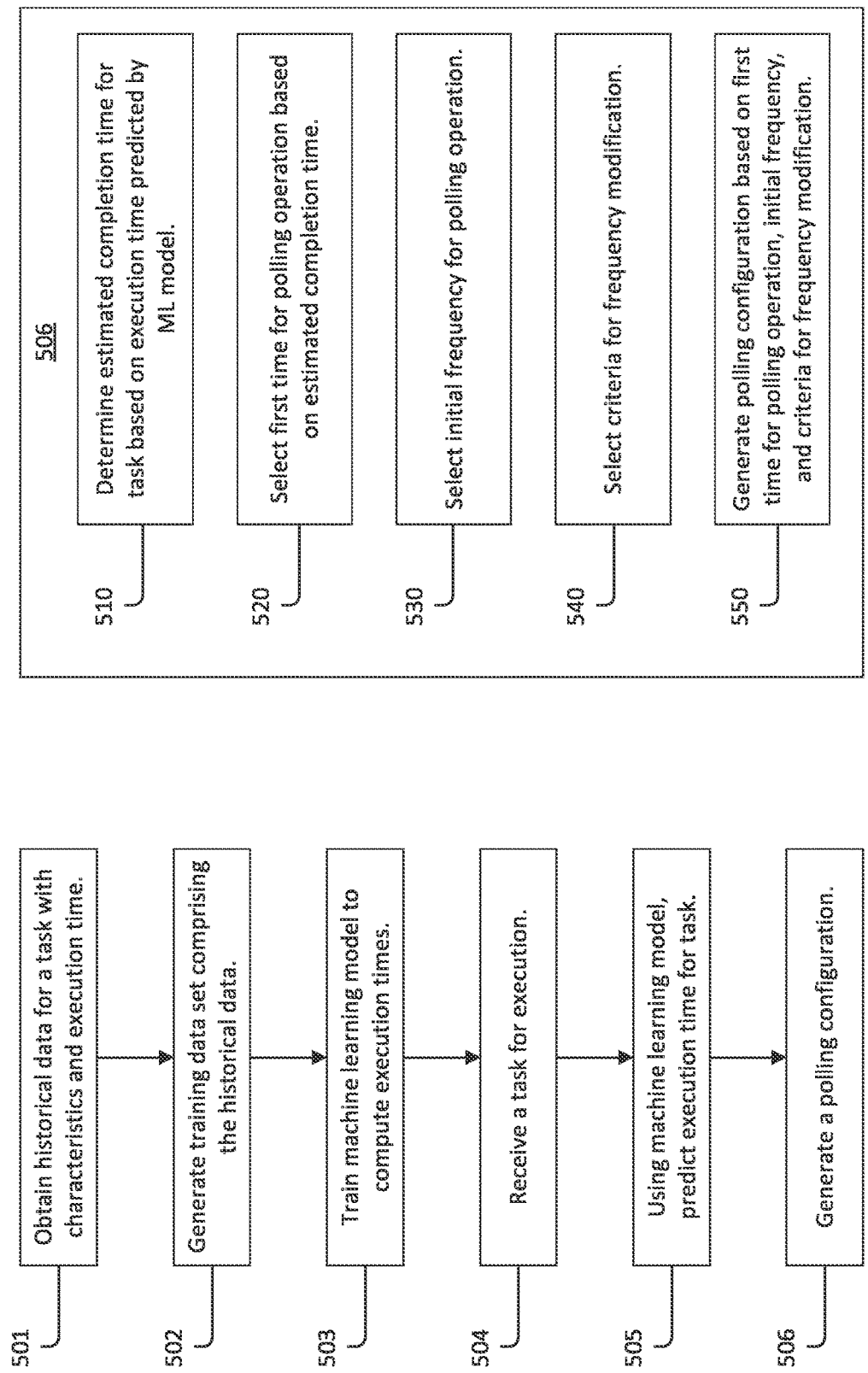
FIG. 5A illustrates the operation of a system in accordance with one or more embodiments.
FIG. 5B illustrates the operation of a system in accordance with one or more embodiments.

FIG. 5A illustrates the operation of a system in accordance with one or more embodiments. At step 501, the system obtains historical data associated with a task. The historical data includes characteristics and execution time for the task. For example, a system designed to import data into a database may have records associated with performance of the data import task. These records may include log entries associated with the services that are triggered during the import operation along with the execution time associated with each service. Other characteristics associated with the task and sub-tasks may include resource usage, performance metrics, time of day, or any other characteristic associated with task performance.

At step 502, the system generates a training data set comprising the historical data. For example, the system may filter the historical data to select relevant data points that align with the training objectives for the data import mechanism. Selection criteria may be predefined to ensure that the training dataset is limited to pertinent information. Data may also be cleansed to correct inconsistencies, address missing values, and remove any erroneous or outlier data that could adversely affect the training process. At this step, data may be categorized, normalized, and transformed into a set of features that accurately represent the patterns and trends relevant to the data import process.

At step 503, the system trains a machine learning model to compute execution times by implementing learning algorithms that help models identify patterns and make predictions or decisions based on input data. For example, training module 126 may manage training of the machine learning model used in the operation of the system in accordance with Section 2, titled "Machine Learning Architecture".

At step 504, the system receives a task for execution. For example, the system may receive a request to import a data set into a database. At step 505, the system uses a machine learning model to predict the execution time for the task received at step 504. The system may use the machine learning model previously trained using the historical data associated with the task. The machine learning model may be managed by a system such as machine learning engine 100. To provide context to the machine learning model, the system may provide characteristics of the task to be executed. For example, the system may provide a list of services to be executed, dependencies, system resource availability (current or expected), amount of data to be processed, network constraints, service levels, or other information that may impact the completion time of the task. For example, orchestration management module 322 may report that service A 340, service B 342, and service c 344 each have certain tasks to perform, and the tasks associated with service A 340 and service B 342 have dependencies on the task associated with service C 344. This and other information is provided to machine learning engine 100 for the purpose of obtaining a prediction representing the time at which all tasks will be complete, and an orchestration summary is expected to be available.

At step 506, the system generates a polling configuration based on the prediction generated at step 505. The polling configuration may include information indicating the time that an orchestration summary may be available for retrieval. In addition, the polling configuration may include information indicating how often requests for the expected information should be made if the previous request is unsuccessful. A polling configuration may also include a task identifier that may be provided back to the system when requests are made that are meant to be associated with a particular task.

FIG. 5B illustrates the operation of a system in accordance with one or more embodiments, providing greater detail on the operations in step 506 in FIG. 5A for generating a polling configuration.

At step 510, the system determines the estimated completion time for a task based on execution time, as predicted by a machine learning model. In an embodiment, the machine learning model provides a predicted execution time for a task to the system based on information associated with the task such as resource utilization, dependencies, and other task-specific information. Based on the prediction from the machine learning model, the system determines the time the task (and associated sub-tasks) will be completed. The time can be represented either as a specific number of seconds from the current moment or as an absolute time of day. The system can work with either representation in an embodiment. In an embodiment, the time may be presented with a margin of error that represents the confidence of the machine learning output.

At step 520, the system selects a first time to begin a polling operation based on the estimated completion time. The time can be represented either as a specific number of seconds from the current moment or as an absolute time of day. This is the time the requesting entity is expected to begin making requests for results, such as orchestration details that provide execution information about a task and its associated sub-tasks.

At step 530, the system selects an initial frequency for the polling operation. The initial frequency may be selected based on the margin of error provided by the machine learning model in an embodiment. For example, if the model predicts that the results will be ready in 120 seconds, and the margin of error is 10%, the system may recommend that polling begin in 108 seconds in case the error favors an earlier completion time. Although it is very likely that the results will be available at the other end of the spectrum (132 seconds), the system may be configured to set the polling frequency as the difference between the predicted time and the earliest suggested time, in this case every 12 seconds (120-108 seconds). In other embodiments, the system may employ other methods of determining a desired polling frequency. For example, machine learning may be used to determine a suggested polling frequency. The training data set may include information about previously recommended polling configurations, and feature vectors associated with the use of the configurations. The system may be configured with a bias toward timely delivery of results, or resource preservation in an embodiment.

At step 540, the system selects criteria for frequency modification. For example, the system may perform a load analysis on the resources impacted by the polling operation. Service level agreements may also be considered. In an embodiment, when results are not available within a configured threshold associated with the predicted completion time (e.g., 2× or 3× the completion time), the system may modify the suggested frequency and provide an updated polling configuration to the requesting entity. In an embodiment, the system may indicate that polling should discontinue due to a failure related to task execution.

At step 550, the system generates a polling configuration based on the first time to begin the polling operation, the initial frequency, and the criteria for frequency modification.

FIG. 5C illustrates an example polling configuration in accordance with one or more embodiments. In an embodiment, a polling configuration is generated based on a predicted execution time in the JSON format as shown in FIG. 5C. In an embodiment, a polling configuration may use other formats and include additional, fewer, or different fields than those shown in FIG. 5C. This polling configuration is a structured guideline for a requesting system on how to periodically check the status of a service or set of services. The pollingInterval of 3000 milliseconds denotes that the client should send a status request every 3 seconds. The endpointUrl, "https://api.oracle.com/status", specifies the URL to which these polling requests should be directed. A timeout value of 1000 milliseconds indicates that the client should wait for a maximum of 1 second for a response before considering the request timed out. The retryPolicy is an object detailing the client's approach to retrying failed requests; it specifies a maximum of 5 retries (maxRetries), a retry interval of 500 milliseconds (retryInterval). It also employs an exponentialBackoff strategy, meaning the time between retries increases exponentially with each attempt. The dataFormat is set to json, indicating that the request and response data should be in JSON format. For security, the authentication field requires a bearer token, "abcdef12345", to authenticate the request. The requestParameters include a taskIdentifier set to "123456", used to identify the specific task or data the client is inquiring about. In an embodiment, this taskIdentifier identifies a specific orchestration summary, but other fields may be used to store the identifier referring to the orchestration summary. The securityProtocol is set to TLSv1.2, ensuring that the communication is encrypted and secure. In errorHandling, different actions are specified for different HTTP response codes: a 404 error should be ignored, a 500 error should prompt a retry, and any other error should be logged (default: "log"). The version field indicates the configuration version, set here as "1.0". The startCondition specifies that polling should commence at "08:00:00". This is the predicted time at which the orchestration summary should be available, based on the prediction from machine learning engine 100. The endCondition indicates that polling should stop when a file is successfully received ("fileReceived": true). The requestor is expecting an orchestration summary, and once this is obtained, the polling process can be concluded.

In accordance with one or more embodiments, the machine learning model is re-applied to estimated characteristics associated with one or more sub-tasks of the second task. For example, for the task to be completed, many sub-tasks may need to be completed. This is particularly true in a microservices environment. In an embodiment, actual characteristics associated with execution of a first sub-task are determined. For example, if a particular task requires the execution of multiple sub-tasks in a particular sequence, and one of the sub-tasks (e.g., the first sub-task in the execution sequence) completes ahead of a predicted execution time, this information and other information associated with the execution of the sub-task may be applied to the machine learning model. The machine learning model is reapplied to the characteristics of the task and the actual characteristics associated with the execution of the first sub-task to predict a new execution time for the task. A new polling configuration can then be generated based on the new execution time predicted for the task by the machine learning model.

In accordance with one or more embodiments, re-applying the machine learning model is responsive to determining that a difference between the predicted characteristics associated with execution of the first sub-task and the actual characteristics associated with the execution of the first sub-task meets a triggering criterion. For example, if the model initially predicts the duration of three distinct services managing three sub-tasks, but one of them is completed significantly faster or slower than predicted, this discrepancy may become a trigger for model re-evaluation. The model would then incorporate this new information to refine its predictions for the remaining services and overall completion of the task. Additionally, if the completion of one service impacts the timeline or resources of another, any deviation from the predicted schedule might trigger a reassessment of the overall service completion predictions for the associated task. Variations in resource availability or utilization may also trigger re-evaluation by the model. For example, if a particular service unexpectedly consumes more resources than anticipated, affecting the availability for subsequent services, the model will need to re-evaluate its predictions considering the current resource landscape. External factors such as changes in operational conditions, unexpected delays, or system disruptions may also trigger model re-evaluation.

In accordance with one or more embodiments, generating the first polling configuration comprises generating (a) a first polling frequency for a first period of time subsequent to receiving the second task that is substantially similar to the second execution time and (b) a second polling frequency for a second period of time, subsequent to the first period of time, that polls more frequently than the first polling frequency. For example, a polling configuration may include instructions for the requesting system to make a first request in 90 seconds, somewhat close to the predicted amount of time needed to complete the task. The polling configuration may include additional instructions indicating that subsequent requests should be made at a higher frequency, such as every 10 seconds, until the request is satisfied. The polling configuration may include other instructions for determining a polling frequency such as by providing a function.

In accordance with one or more embodiments, the historical data further comprises a first set of characteristics of a first system that executed the first task in the first execution time, and the machine learning model is further applied to a second set of characteristics corresponding to a second system that executes the second task. For example, the machine learning model may be trained on one system but used to predict behavior on a different system. Alternatively, the first and second systems may be the same system.

In an embodiment, a task is received from a requesting entity, and the system transmits the first polling configuration to the requesting entity. The requesting entity then executes operations to request the results in accordance with the first polling configuration. Results may be any expected response to a polling operation. In an embodiment, results may represent an orchestration summary describing the status of one or more tasks performed by a system or set of services. An orchestration summary, for example, may not be available until all tasks associated with a request are complete. In another embodiment, results may represent other types of data or information expected in response to a request, such as a single file, a set of files, a status notification, or input from another device such as a user interface or a sensor.

In accordance with one or more embodiments, the task to be performed is associated with an identifier. A relationship between the task and the identifier may be persisted in a database or other storage mechanism. The task identifier is transmitted to the requesting entity with the polling configuration, so the requesting entity can use it to reference the task in later communications with the system. For example, the requesting entity may use the polling configuration to check the status of the task (and associated sub-tasks) stored in the form of an orchestration summary that provides details about the completion of the task after the task has been completed. To make sure the system provides the correct orchestration summary, the requesting system provides the correct task identifier. The system then uses the task identifier to determine the orchestration summary that is to be provided to the requesting entity.

In accordance with one or more embodiments, a task may comprise a first subtask and a second subtask. After the performance of the first sub-task, a second polling configuration is transmitted to the requesting entity. The second polling configuration is associated with the same task identifier as the first polling configuration.

In accordance with one or more embodiments, in response to determining a final state of the first sub-task has been achieved and determining a final state of the second sub-task has been achieved, the system generates results in the form of a task orchestration summary for the task. The task orchestration summary is based at least in part on a) characteristics associated with executing the first sub-task and b) characteristics associated with executing the second sub-task. The results (e.g., task orchestration summary) are then stored in a data repository, along with a task identifier which can be used for retrieval. In response to receiving the polling request from the requesting entity, the system sends an orchestration response to the requesting entity that includes data associated with the task orchestration summary. For example, the response may include the entire orchestration summary, a portion of the orchestration summary, or a report based on the orchestration summary.

5. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally, or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, that are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource if the tenant and the particular network resources are associated with a same tenant ID.

In an embodiment, each tenant is associated with a tenant ID. Each application, implemented by the computer network, is tagged with a tenant ID. Additionally, or alternatively, each data structure and/or dataset, stored by the computer network, is tagged with a tenant ID. A tenant is permitted access to a particular application, data structure, and/or dataset if the tenant and the particular application, data structure, and/or dataset are associated with a same tenant ID.

As an example, each database implemented by a multi-tenant computer network may be tagged with a tenant ID. A tenant associated with the corresponding tenant ID may access data of a particular database. As another example, each entry in a database implemented by a multi-tenant computer network may be tagged with a tenant ID. A tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, that are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may additionally, or alternatively, provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for that the trigger condition was satisfied. Additionally, or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
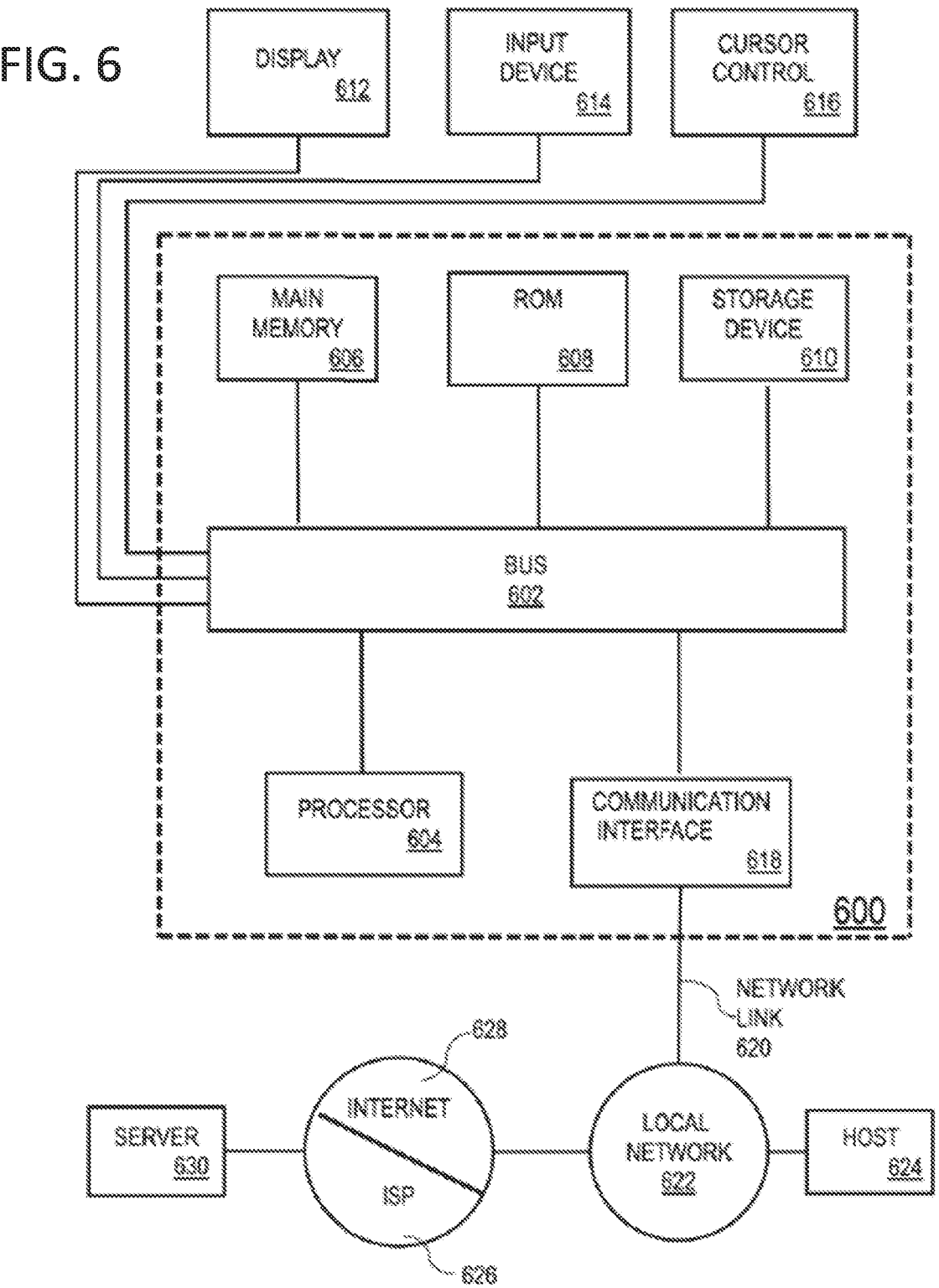
FIG. 6 shows a block diagram that illustrates a computer system in accordance with one or more embodiments.

For example, FIG. 6 is a block diagram that illustrates a computer system 600 upon that an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or a Solid State Drive (SSD) is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic that in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from that processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, that carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in that such claims issue, including any subsequent correction.

What is claimed is:

1. One or more non-transitory computer readable media comprising instructions which, when executed by one or more hardware processors, cause performance of operations comprising:
   obtaining historical data comprising:
      characteristics of a first task;
      a first execution time for the first task;
   generating a training data set comprising the historical data;
   training a machine learning model to compute execution times for tasks based on the training data set;
   receiving a second task for execution;
   applying the machine learning model to characteristics of the second task to predict a second execution time for the second task; and
   generating a first polling configuration for requesting results based at least on the second execution time predicted by the machine learning model.

2. The non-transitory media of claim 1, wherein the machine learning model is re-applied to estimated characteristics associated with execution of a first sub-task of the second task, wherein the operations further comprise:
   determining actual characteristics associated with execution of the first sub-task;
   reapplying the machine learning model to the characteristics of the first task and the actual characteristics associated with the execution of the first sub-task to predict a third execution time for the second task; and
   generating a second polling configuration for requesting the results based at least on the third execution time predicted by the machine learning model.

3. The non-transitory media of claim 2, wherein re-applying the machine learning model is responsive to determining that a difference between the predicted characteristics associated with execution of the first sub-task and the actual characteristics associated with the execution of the first sub-task meets a triggering criterion.

4. The non-transitory media of claim 1, wherein generating the first polling configuration comprises generating (a) a first polling frequency for a first period of time subsequent to receiving the second task that is substantially similar to the second execution time and (b) a second polling frequency for a second period of time, subsequent to the first period of time, that polls more frequently than the first polling frequency.

5. The non-transitory media of claim 4, wherein the historical data further comprises a first set of characteristics of a first system that executed the first task in the first execution time, and wherein the machine learning model is further applied to a second set of characteristics corresponding to a second system that executes the second task.

6. The non-transitory media of claim 1, wherein the second task is received from a requesting entity, and wherein the operations further comprise transmitting the first polling configuration to the requesting entity, wherein the requesting entity executes operations to request the results in accordance with the first polling configuration.

7. The non-transitory media of claim 1, wherein the second task is received from a requesting entity, wherein the operations further comprise:
   associating the second task with a first task identifier;
   transmitting the first task identifier to the requesting entity;
   transmitting the first polling configuration to the requesting entity; and
   receiving, from the requesting entity, a polling request, wherein the polling request includes the first task identifier.

8. The non-transitory media of claim 7, wherein the second task comprises a first sub-task and a second sub-task, wherein the operations further comprise:
   subsequent to the performance of the first sub-task of the second task,
      transmitting a second polling configuration to the requesting entity,
      wherein the second polling configuration is associated with the first task identifier.

9. The non-transitory media of claim 7, wherein the second task comprises a first sub-task and a second sub-task, wherein the operations further comprise:
   in response to determining a final state of the first sub-task has been achieved and determining a final state of the second sub-task has been achieved, generating a task orchestration summary for the second task;
wherein the task orchestration summary is based at least in part on a) characteristics associated with the execution of the first sub-task and b) characteristics associated with the execution of the second sub-task; and
in response to receiving the polling request from the requesting entity, sending an orchestration response to the requesting entity, wherein the orchestration response includes data associated with the task orchestration summary.

10. The non-transitory media of claim 1, wherein the second task comprises a first sub-task and a second sub-task, wherein the second task is received from a requesting entity, wherein the machine learning model is re-applied to estimated characteristics associated with execution of the first sub-task, wherein the operations further comprise:
determining actual characteristics associated with execution of the first sub-task;
re-applying the machine learning model to the characteristics of the first task and the actual characteristics associated with the execution of the first sub-task to predict a third execution time for the second task, wherein re-applying the machine learning model is responsive to determining that a difference between the predicted characteristics associated with execution of the first sub-task and the actual characteristics associated with the execution of the first sub-task meets a triggering criterion;
generating a second polling configuration for requesting the results based at least on the third execution time predicted by the machine learning model
wherein generating the first polling configuration comprises generating (a) a first polling frequency for a first period of time subsequent to receiving the second task that is substantially similar to the second execution time and (b) a second polling frequency for a second period of time, subsequent to the first period of time, that polls more frequently than the first polling frequency;
wherein the historical data further comprises a first set of characteristics of a first system that executed the first task in the first execution time, and wherein the machine learning model is further applied to a second set of characteristics corresponding to a second system that executes the second task;
associating the second task with a first task identifier;
transmitting the first polling configuration and the first task identifier to the requesting entity;
subsequent to the performance of the first sub-task of the second task, transmitting a second polling configuration to the requesting entity, wherein the second polling configuration is associated with the first task identifier;
in response to determining a final state of the first sub-task has been achieved and determining a final state of the second sub-task has been achieved, generating a task orchestration summary for the second task;
wherein the task orchestration summary is based at least in part on a) characteristics associated with the execution of the first sub-task and b) characteristics associated with the execution of the second sub-task; and
in response to receiving a polling request from the requesting entity that includes the first task identifier, sending an orchestration response to the requesting entity, wherein the orchestration response includes data associated with the task orchestration summary.

11. A method, comprising:
obtaining historical data comprising:
characteristics of a first task;
a first execution time for the first task;
generating a training data set comprising the historical data;
training a machine learning model to compute execution times for tasks based on the training data set;
receiving a second task for execution;
applying the machine learning model to characteristics of the second task to predict a second execution time for the second task;
generating a first polling configuration for requesting results based at least on the second execution time predicted by the machine learning model; and
wherein the method is performed by at least one device including a hardware processor.

12. The method of claim 11, wherein the machine learning model is re-applied to estimated characteristics associated with execution of a first sub-task of the second task, further comprising:
determining actual characteristics associated with execution of the first sub-task;
reapplying the machine learning model to the characteristics of the first task and the actual characteristics associated with the execution of the first sub-task to predict a third execution time for the second task; and
generating a second polling configuration for requesting the results based at least on the third execution time predicted by the machine learning model.

13. The method of claim 12, wherein re-applying the machine learning model is responsive to determining that a difference between the predicted characteristics associated with execution of the first sub-task and the actual characteristics associated with the execution of the first sub-task meets a triggering criterion.

14. The method of claim 11, wherein generating the first polling configuration comprises generating (a) a first polling frequency for a first period of time subsequent to receiving the second task that is substantially similar to the second execution time and (b) a second polling frequency for a second period of time, subsequent to the first period of time, that polls more frequently than the first polling frequency.

15. The method of claim 14, wherein the historical data further comprises a first set of characteristics of a first system that executed the first task in the first execution time, and wherein the machine learning model is further applied to a second set of characteristics corresponding to a second system that executes the second task.

16. The method of claim 11, wherein the second task is received from a requesting entity, and wherein the operations further comprise transmitting the first polling configuration to the requesting entity, wherein the requesting entity executes operations to request the results in accordance with the first polling configuration.

17. The method of claim 11, wherein the second task is received from a requesting entity, further comprising:
associating the second task with a first task identifier;
transmitting the first task identifier to the requesting entity;
transmitting the first polling configuration to the requesting entity; and
receiving, from the requesting entity, a polling request, wherein the polling request includes the first task identifier.

18. The method of claim 17, wherein the second task comprises a first sub-task and a second sub-task, further comprising:

subsequent to the performance of the first sub-task of the second task, transmitting a second polling configuration to the requesting entity, wherein the second polling configuration is associated with the first task identifier.

19. The method of claim 17, wherein the second task comprises a first sub-task and a second sub-task, further comprising:
 in response to determining a final state of the first sub-task has been achieved and determining a final state of the second sub-task has been achieved, generating a task orchestration summary for the second task;
 wherein the task orchestration summary is based at least in part on a) characteristics associated with the execution of the first sub-task and b) characteristics associated with the execution of the second sub-task; and
 in response to receiving the polling request from the requesting entity, sending an orchestration response to the requesting entity, wherein the orchestration response includes data associated with the task orchestration summary.

20. The method of claim 11, wherein the second task comprises a first sub-task and a second sub-task, wherein the second task is received from a requesting entity, wherein the machine learning model is re-applied to estimated characteristics associated with execution of the first sub-task, further comprising:
 determining actual characteristics associated with execution of the first sub-task;
 re-applying the machine learning model to the characteristics of the first task and the actual characteristics associated with the execution of the first sub-task to predict a third execution time for the second task, wherein re-applying the machine learning model is responsive to determining that a difference between the predicted characteristics associated with execution of the first sub-task and the actual characteristics associated with the execution of the first sub-task meets a triggering criterion;
 generating a second polling configuration for requesting the results based at least on the third execution time predicted by the machine learning model
 wherein generating the first polling configuration comprises generating (a) a first polling frequency for a first period of time subsequent to receiving the second task that is substantially similar to the second execution time and (b) a second polling frequency for a second period of time, subsequent to the first period of time, that polls more frequently than the first polling frequency;
 wherein the historical data further comprises a first set of characteristics of a first system that executed the first task in the first execution time, and wherein the machine learning model is further applied to a second set of characteristics corresponding to a second system that executes the second task;
 associating the second task with a first task identifier;
 transmitting the first polling configuration and the first task identifier to the requesting entity;
 subsequent to the performance of the first sub-task of the second task, transmitting a second polling configuration to the requesting entity, wherein the second polling configuration is associated with the first task identifier;
 in response to determining a final state of the first sub-task has been achieved and determining a final state of the second sub-task has been achieved, generating a task orchestration summary for the second task;
 wherein the task orchestration summary is based at least in part on a) characteristics associated with the execution of the first sub-task and b) characteristics associated with the execution of the second sub-task; and
 in response to receiving a polling request from the requesting entity that includes the first task identifier, sending an orchestration response to the requesting entity, wherein the orchestration response includes data associated with the task orchestration summary.

\* \* \* \* \*